(12) United States Patent
Paknad

(10) Patent No.: US 7,895,229 B1
(45) Date of Patent: Feb. 22, 2011

(54) CONDUCTING CROSS-CHECKS ON LEGAL MATTERS ACROSS AN ENTERPRISE SYSTEM

(75) Inventor: Deidre Paknad, Mountain View, CA (US)

(73) Assignee: PSS Systems, Inc., Mountain View, CA (US)

( * ) Notice: Subject to any disclaimer, the term of this patent is extended or adjusted under 35 U.S.C. 154(b) by 606 days.

(21) Appl. No.: 11/807,145

(22) Filed: May 24, 2007

(51) Int. Cl.
*G06F 17/00* (2006.01)
(52) U.S. Cl. .................. 707/769; 707/640; 707/655
(58) Field of Classification Search .................. 707/10
See application file for complete search history.

(56) References Cited

U.S. PATENT DOCUMENTS

| | | | |
|---|---|---|---|
| 5,355,497 A * | 10/1994 | Cohen-Levy | 707/716 |
| 5,701,472 A * | 12/1997 | Koerber et al. | 707/655 |
| 5,903,879 A | 5/1999 | Mitchell | |
| 6,115,642 A | 9/2000 | Brown et al. | |
| 6,128,620 A | 10/2000 | Pissanos et al. | |
| 6,151,031 A * | 11/2000 | Atkins et al. | 345/441 |
| 6,173,270 B1 | 1/2001 | Cristofich et al. | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,539,379 B1 | 3/2003 | Vora et al. | |
| 6,622,128 B1 | 9/2003 | Bedell et al. | |
| 6,738,760 B1 | 5/2004 | Krachman | |
| 6,944,597 B2 | 9/2005 | Callen et al. | |
| 7,076,439 B1 * | 7/2006 | Jaggi | 705/9 |
| 7,127,470 B2 | 10/2006 | Takeya | |
| 7,197,716 B2 * | 3/2007 | Newell et al. | 715/760 |
| 7,283,985 B2 * | 10/2007 | Schauerte et al. | 707/1 |
| 7,386,468 B2 | 6/2008 | Calderaro et al. | |
| 7,433,832 B1 * | 10/2008 | Bezos et al. | 705/26 |
| 2002/0007333 A1 | 1/2002 | Scolnik et al. | |
| 2002/0010708 A1 | 1/2002 | McIntosh | |
| 2002/0022982 A1 | 2/2002 | Cooperstone et al. | |
| 2002/0083090 A1 | 6/2002 | Jeffrey et al. | |
| 2002/0103680 A1 | 8/2002 | Newman | |
| 2002/0143595 A1 | 10/2002 | Frank et al. | |
| 2002/0143735 A1 | 10/2002 | Ayi et al. | |
| 2002/0184068 A1 | 12/2002 | Krishnan et al. | |
| 2002/0184148 A1 | 12/2002 | Kahn et al. | |
| 2003/0004985 A1 | 1/2003 | Kagimasa et al. | |

(Continued)

OTHER PUBLICATIONS

"mySAAP ERP Human Capital Management: Maximizing Workforce Potential", <a href="http://web.archive.org/web/20060823140053/www.sap.com/solutions/businesss-suite/erp/hcm/index.exp"?http://web.archive.org/web/2006...</a>.

(Continued)

*Primary Examiner*—Shahid A Alam
(74) *Attorney, Agent, or Firm*—Carr & Ferrell LLP

(57) ABSTRACT

Exemplary systems and methods for conducting cross-checks on legal matters across an enterprise system are provided. In exemplary embodiments, search parameters are received from a user to search for custodians across the plurality of legal matters that are affected. A cross-check module then accesses legal matter information. An analysis of whether a custodian is common to more than one legal matter based on the search parameters, tracked relationships, and the legal matter information is performed. Results are then provided to the user. In further embodiments, the cross-check module may also provide a listing of collected data based on the cross-check analysis.

17 Claims, 8 Drawing Sheets

U.S. PATENT DOCUMENTS

| | | |
|---|---|---|
| 2003/0014386 A1 | 1/2003 | Jurado |
| 2003/0046287 A1 | 3/2003 | Joe, Jr. |
| 2003/0051144 A1 | 3/2003 | Williams |
| 2003/0069839 A1 | 4/2003 | Whittington et al. |
| 2003/0097342 A1 | 5/2003 | Whittingtom |
| 2003/0110228 A1 | 6/2003 | Xu et al. |
| 2003/0229522 A1 | 12/2003 | Thompson et al. |
| 2004/0034659 A1 | 2/2004 | Steger |
| 2004/0060063 A1* | 3/2004 | Russ et al. .................... 725/46 |
| 2004/0068432 A1 | 4/2004 | Meyerkopf et al. |
| 2004/0088332 A1* | 5/2004 | Lee et al. .................... 707/609 |
| 2004/0088729 A1* | 5/2004 | Petrovic et al. ............... 725/91 |
| 2004/0138903 A1 | 7/2004 | Zuniga |
| 2004/0187164 A1* | 9/2004 | Kandasamy et al. ........ 725/132 |
| 2004/0193703 A1 | 9/2004 | Loewy et al. |
| 2004/0204947 A1 | 10/2004 | Li et al. |
| 2004/0260569 A1* | 12/2004 | Bell et al. ...................... 705/1 |
| 2005/0071251 A1* | 3/2005 | Linden et al. .................. 705/26 |
| 2005/0114241 A1 | 5/2005 | Hirsch et al. |
| 2005/0203821 A1 | 9/2005 | Petersen et al. |
| 2006/0095421 A1 | 5/2006 | Nagai et al. |
| 2006/0136435 A1 | 6/2006 | Nguyen et al. |
| 2006/0230044 A1* | 10/2006 | Utiger ......................... 707/10 |
| 2007/0100857 A1 | 5/2007 | DeGrande et al. |
| 2007/0156418 A1 | 7/2007 | Richter et al. |
| 2007/0162417 A1* | 7/2007 | Cozianu et al. ................ 707/1 |
| 2007/0271517 A1 | 11/2007 | Finkelman et al. |
| 2009/0037376 A1* | 2/2009 | Archer et al. ................... 707/3 |

OTHER PUBLICATIONS

Zhu et al., "Query Expansion Using Web Access Log Files," Lecture Notes in Computer Science, 2005, vol. 3588/2005, pp. 686-695, Springer-Verlag Berlin Heidelberg, 2005.

* cited by examiner

Custodial Cross Check - Holds

Matter: [Best IPO SEC Investigation] ~702

Include: ● Active Matters
⚪ All Matters - active & inactive   } ~704

[Search] ~706

Custodians involved in other holds or matters:

Joe Smith <joe.smith@company.com>
  *American Business v. JRG RE Company*
    R1: initial preservation request (completed)
    R2: first documents request (in progress)

NYC Investment Bank Deal Server Steward: Sam Jax <sam.jax@company.com>  708
  *American Business v. JRG RE Company*
    R1: initial preservation request (completed)
  *Old Banc Shareholders v. GFRD*
    R1: inquiry letter received (in progress)

FIG. 7

Search for Collections by Name

Name: [ Smith ] ⟵ 802

Search: ⦿ Custodians (Persons)  
        ○ Custodial Systems (Repositories) ⎬ 804

Include: ○ Active Matters  
         ⦿ All Matters - active & inactive ⎬ 806

[ Search ]

Custodians under hold:

Joe Smith <joe.smith@company.com>
   *American Business v. JRG RE Company*
      R1: joe.smith mailbox, years 2000 and 2001 (39222 messages, 124GB, coll
      R2: image of laptop joe-9339-ibmt42 (9992 files, 22GB, collected June 19,
   *Best IPO SEC Investigation*
      R1: joe.smith mailbox, years 2000 and 2001 (39222 messages, 124GB, coll
      R1: mailbox, year 2002 (19763 messages, 73GB, collected July 19, 2003)

CONDUCTING CROSS-CHECKS ON LEGAL MATTERS ACROSS AN ENTERPRISE SYSTEM

CROSS REFERENCE TO RELATED APPLICATION

The present application is related to U.S. patent application Ser. No. 11/505,665, filed Aug. 16, 2006 and entitled "Systems and Methods for Utilizing Organization-Specific Classification Codes;" U.S. patent application Ser. No. 11/505,537, filed Aug. 16, 2006 and entitled "Systems and Methods for Utilizing an Enterprise Map to Determine Affected Entities;" U.S. patent application Ser. No. 11/512,880, filed Aug. 29, 2006 and entitled "Systems and Methods for Providing a Map of an Enterprise System," which are all herein incorporated by reference.

BACKGROUND OF THE INVENTION

1. Field of the Invention

Embodiments of the present invention relate generally to data management and more particularly to conducting cross-checks on data.

2. Description of Related Art

Conventionally, information retrieval is accomplished by searches using keywords, people, and dates. If a specific set of information is sought, very specific parameters may need to be input into a system that maintains the information in order to locate the set of information.

For litigation, tax, or regulation purposes, data and evidence within a company is required to be preserved in anticipation of, or during, the legal matter. Traditionally, the company will identify affected employees and systems likely to be associated with the legal matter related data and evidence. In large companies, however, the identification of affected employees and systems is often complex. The complexity may be exacerbated by hundreds or thousands of business systems, drives, and cabinets that house the data. Furthermore, a large company may have any number (e.g., hundreds or thousands) of active legal matters at any one time. Additionally, employee turnover and reassignment may be frequent, making it difficult to determine who is involved in any particular legal matter. Oftentimes, an employee or system may be involved in more than one legal matter which will require the employee or system to preserve data such as documents. Sometimes, the preserved data may transcend more than one legal matter.

For example, when one legal matter is completed, it is desirable to quickly release the employee or system from a legal hold as continued preservation of data and suspension of routine actions can be expensive. However, before the employee or system is released from the legal hold, it would be desirable to perform a cross-check to determine if a legal hold is in effect for a different legal matter. As such, there is a need for a system and method that conducts a cross-check on legal matters across an enterprise system.

SUMMARY OF THE INVENTION

Embodiments of the present invention provide systems and methods for conducting cross-checks on legal matters across an enterprise system. In some embodiments, the cross-check involves legal holds existing on legal matters. In exemplary embodiments, search parameters are received from a user. The search parameters may comprise a name (e.g., custodian name, custodial system, legal matter name) and an indication of whether to search active matters, inactive matters, or all matters.

Based on the parameters, a cross-check module then accesses legal matter information. In exemplary embodiments, the legal matter information is stored in a legal matter repository. The legal matter repository may comprise data on the legal matters and all affected people (e.g., custodians) and affected systems (e.g., custodial systems and their respective stewards), along with the status associated with the legal matter. The legal matter repository may also comprise collected data from the affected people and systems. In some embodiments, the legal matter information may be associated with one or more legal holds.

In exemplary embodiments, an analysis of whether a custodian or custodial system is common to more than one legal matter based on the search parameters and the legal matter information is performed. Thus, for example, before a custodian is released from a legal hold on a matter that may no longer be active, a cross-check may be performed to determine if other legal holds or legal matters for the same custodian may be affected by the release.

Results are then provided to the user. The results may comprise a listing of all legal holds for a particular custodian or custodial system. In another embodiment, the results may comprise a cross-check list of custodians and custodial systems that intersect with a particular legal matter. In a further embodiment, a list of collected data for a particular name (i.e., custodian or custodial system) may be provided.

In some embodiments, when a release notice is created, a cross-check on the custodians & custodial systems is performed. If the cross-check turns up current active holds on other matters, an approval workflow may be triggered that will automatically route a draft (proposed) release to various pre-configured parties in a legal team for publication approval. Example parties may include the attorneys for the other matters where the custodian is under hold.

BRIEF DESCRIPTION OF THE DRAWINGS

FIG. 7 is a screenshot of a user interface for performing a custodial cross check.

FIG. 8 is a screenshot of a user interface for searching for collections by name.

DETAILED DESCRIPTION OF EXEMPLARY EMBODIMENTS

Embodiments of the present invention provide an exemplary system and method for utilizing an enterprise map in order to conduct a cross-check on legal matters in an enterprise system. The enterprise map comprises a plurality of affected entities (e.g., entities under an obligation of a legal hold or otherwise involved in the legal matter). These entities may comprise people and systems in, or associated with, an enterprise. The enterprise map comprises relationships between various objects that represent the data comprising the enterprise. Based on these relationships in the enterprise map, affected people and systems may be determined. Affected people may comprise individual employees, record coordinators and administrators responsible for a class of information or associated with an information repository, and system administrators and IT staff responsible for the information repositories along with names, contact information, e-mail addresses, organizations; and location of the employees. Affected systems may comprise the repositories storing data of interest (e.g., data under a legal hold). In some embodiments, the affected people may have physical possession of the data of interest. For simplicity, affected people and systems may be collectively termed "custodians."

By performing cross-checks on the derived lists of affected people and systems, data and evidence integrity may be insured while efficiently determining releases from legal holds. Legal holds comprise instructions to affected people (e.g., custodians) or stewards of an affected system (e.g., custodial system) to retain data or evidence that may be of interest in a legal matter.

Figure 1:
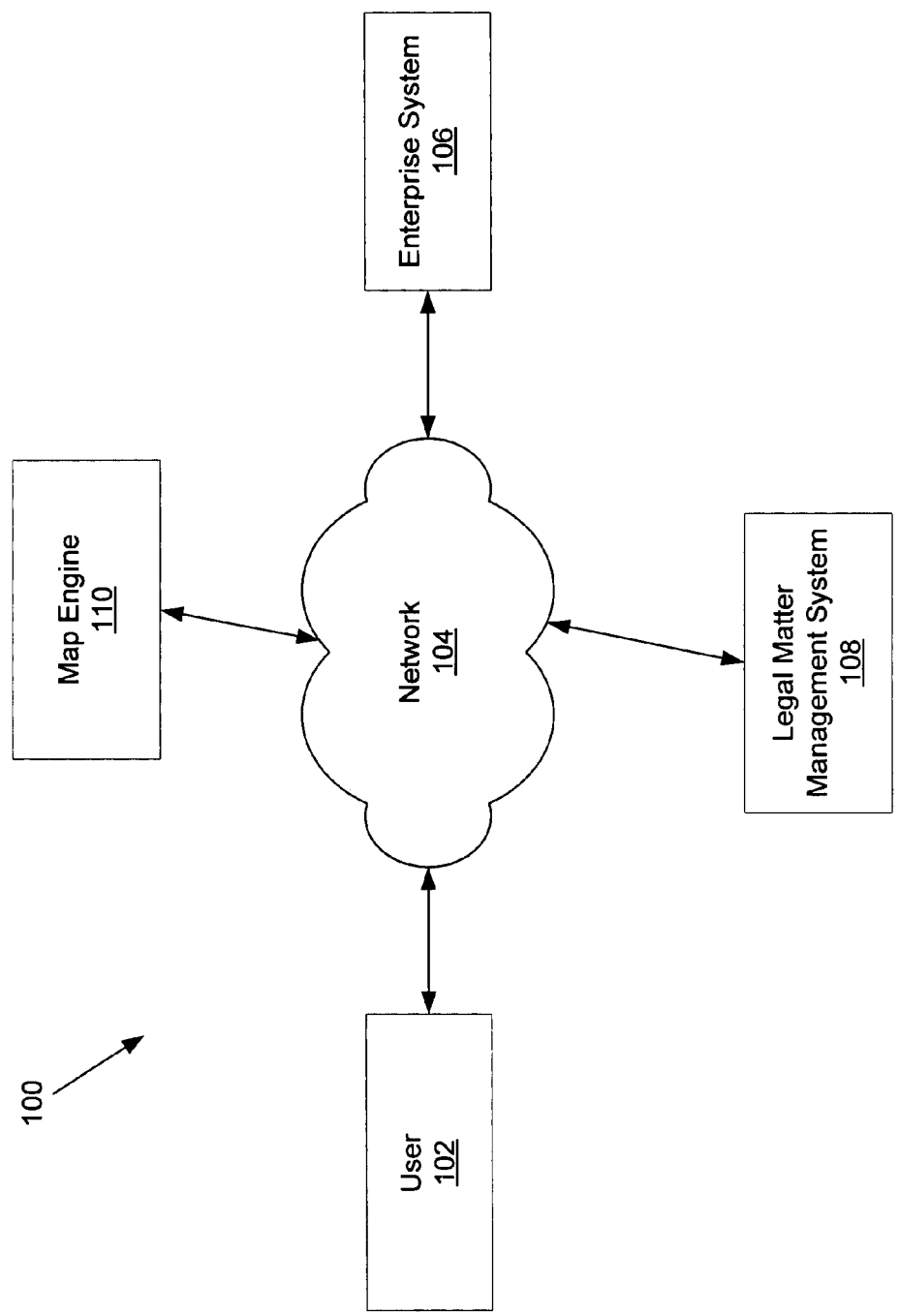
FIG. 1 is a diagram of an exemplary environment in which embodiments of the present invention may be practiced.

FIG. 1 shows an exemplary environment 100 in which embodiments of the present invention may be practiced. The environment 100 comprises at least one user 102 coupled via a network 104 to an enterprise system 106. In exemplary embodiments, the network 104 may be a local area network, a wide area network, peer-to-peer network, or the Internet. Alternatively, the user 102 may be coupled directly to the enterprise system 106 or access the enterprise system 106 from within the enterprise system 106. In some embodiments, more than one network 104 and/or more than one type of network 104 may be utilized to allow the components of the environment 100 to communicate with each other.

Any number of users 102 may be present in the environment 100. The user 102 may be an individual accessing the legal matter management engine 108 via a computing device associated with the user 102 in order to determine and cross-check affected people and systems associated with a matter. In exemplary embodiments, the matter is a legal matter, and may comprise, for example, a pending or potential litigation, tax inquiry, or regulatory inquiry matter. In these embodiments, the user 102 may comprise an attorney or legal staff associated with the legal matter. However, in alternative embodiments, the matter may be related to any matter of interest to the user 102 (e.g., internal investigation, policy-related examination/investigation, or audit). For simplicity of discussion, the following description will be presented with reference to a legal matter. However, it is understood that embodiments of the present invention may be applied to any type of matter.

In some embodiments, a computing device associated with the user 102 may comprise an optional business application (not shown) that performs actions related to the enterprise map. For example, the business application may interact with a legal matter management system 108 to perform the cross-checking functions described herein. In an alternative embodiment, the business application may comprise the legal matter management system 108 and/or a map engine 110 that generates the enterprise map. In other embodiments, the business application interacts with a user interface module in the map engine 110 and/or the legal management system 108, as will be discussed below.

The exemplary enterprise system 106 may comprise any number of servers, client devices, and repositories comprising data. The enterprise system 106 may further comprise a totality of IT, storage and information management systems in an enterprise, including those internally managed, outsourced, etc. The data may comprise documents, files, audio and video media, e-mail communication, and any other information which may be stored in repositories. Repositories may comprise both physical and digital storage media including warehouses, filing cabinets, hard drives, and other digital media storage devices. The repositories may be located anywhere in an enterprise (e.g., in different jurisdictions).

The exemplary map engine 110 maintains a map comprising a structure that represents people, repositories, organizations, and documents via relationships. The map engine 110 utilizes information types, organizations, storage locations, people, and other objects and their relationships to provide an overall map structure that is used to derive relationships between people, repositories, and organizations. As a result, the user 102 can use the map to determine affected people and systems in the enterprise system 106. The map engine 110 and creation of the enterprise map is described in further detail in co-pending U.S. patent application Ser. No. 11/512,880, filed Aug. 29, 2006 and entitled "Systems and Methods for Providing a Map of an Enterprise System," and U.S. patent application Ser. No. 11/505,537, filed Aug. 16, 2006 and entitled "Systems and Methods for Utilizing an Enterprise Map to Determine Affected Entities," both of which are incorporated by reference. While the map engine 110 is shown coupled to the enterprise system 106, the map engine 110 may be comprised within the enterprise system 106, according to some embodiments of the present invention.

The legal matter management system 108 is configured to allow users to manage preservation and production of data associated with legal matters. The exemplary legal matter management system 108 is discussed herein as being utilized to determine affected people and systems associated with the legal matters and to cross-check the derived list of affected people and systems. However, the legal matter management system 108 may be utilized to determine affected people and systems for any reason. For example, the user 102 may use the legal management system 108 to find affected people and systems associated with a merger transaction in order to review, hold/preserve, or collect certain documents, or to interview the affected people. While the legal matter management system 108 is shown coupled to the enterprise system 106, the legal matter management system 108 may be embodied within the enterprise system 106, in various embodiments of the present invention. The legal matter management system 108 will be discussed in more detail in connection with FIG. 2.

It should be noted that the environment 100 of FIG. 1 is exemplary. Alternative embodiments may, for example, comprise the various components of the environment 100 in communication with each other in a different manner. For example, a device of the user 102, the legal matter management system 108, and the map engine 110, may all, or in various combinations, be embodied within the enterprise system 106.

Figure 2:
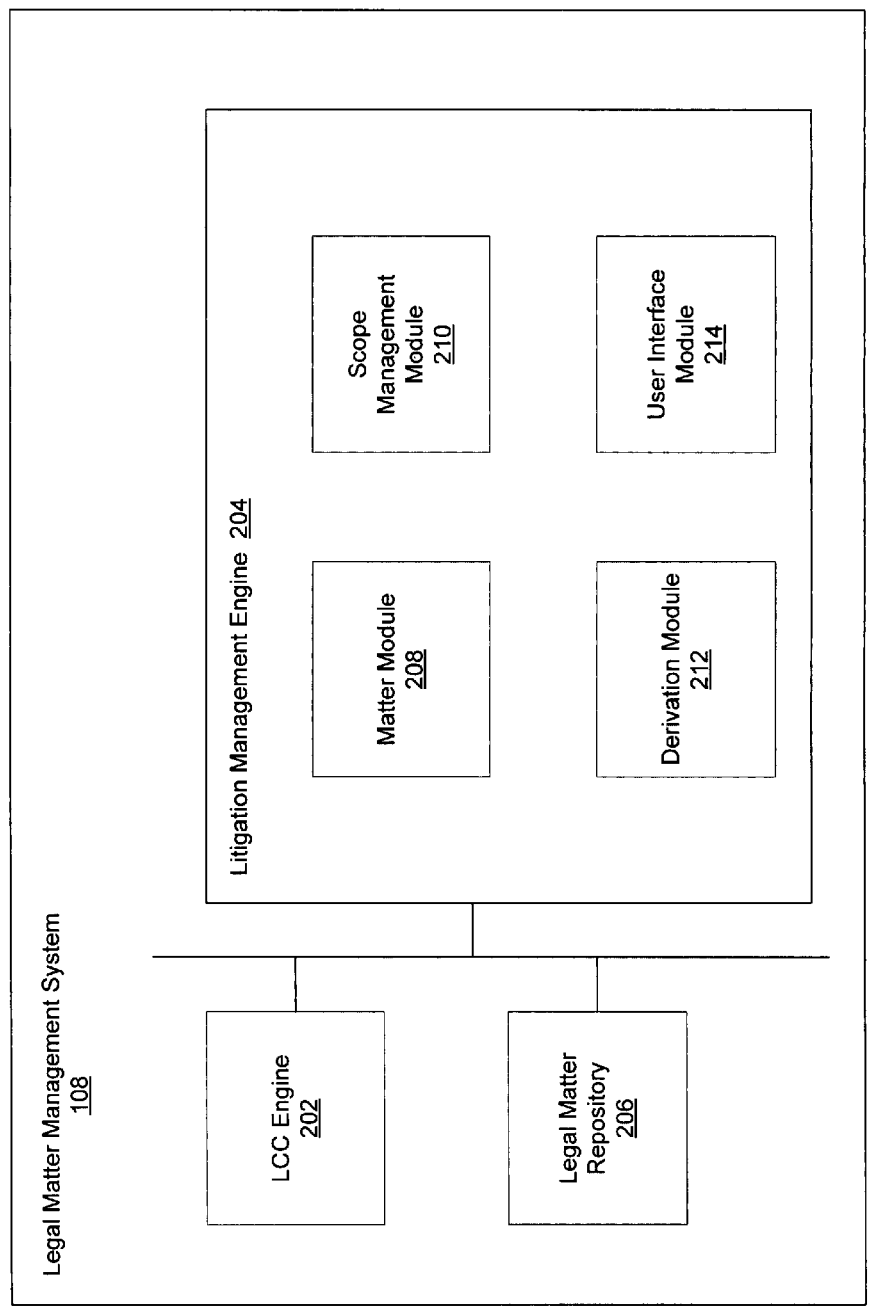
FIG. 2 is a block diagram of an exemplary legal matter management system.

Referring now to FIG. 2, a detailed block diagram of the exemplary legal matter management system 108 is shown. In exemplary embodiments, the legal matter management system 108 comprises a legal communication and collections (LCC) engine 202, a litigation management engine 204, and a legal matter repository 206 configured for storing legal matter information. The LCC engine 202 will be discussed in more detail in connection with FIG. 3.

The litigation management engine 204 manages the legal matters within the enterprise system 106, and comprises a matter module 208, a scope management module 210, a derivation module 212, and a user interface module 214. Alternative embodiments may comprise more, less, or functionally equivalent modules. Furthermore, some of the modules of the litigation management engine 204 may be comprised in the map engine 110 or vice versa. While the litigation management engine 204 will be discussed in a context of a litigation matter and search, alternative embodiments allow for the search to be associated with non-litigation matters (e.g. internal investigations, government regulatory request for information, etc.).

In some embodiments, some of the components of the litigation management engine 204 are located at a device associated with the user 102, and operate within the device of the user to provide the functionalities described below. In other embodiments, the litigation management engine 204 is completely located at the device associated with the user 102. In yet other embodiments, the litigation management engine 204 is completely separate from the device of the user 102, and the user 102 accesses the litigation management engine 204 via the network 104.

The exemplary matter module 208 creates and maintains the legal matter which will be managed by the legal matter management system 108. The legal matter identifies a matter for which affected people & systems are being determined (e.g., derivation of a list of affected people and/or systems). The legal matter may also identify the attorneys and other staff that are working on the legal matter. By identifying the relevant staff, for example, work flow may be automatically generated for the staff upon determination of the affected people and systems. Furthermore, results of the derivation may be stored based on the legal matter.

The scope management module 210 is configured to receive scope parameters from the user 102 for the derivation of key people and systems. In some embodiments, the scope management module 210 provides a graphical user interface (GUI) that allows the user 102 to provide the scope parameters. The scope parameters are one or more map objects that are known to intersect the legal matter in some manner. For example, if the legal matter involves a specific organization or information type, the user 102 can provide those objects as the scope parameters. Scope and map objects will be discussed in more detail in connection with FIG. 4.

The derivation module 212 takes the scope parameters and traverses the map in order to determine the affected people and systems associated with the legal matter based on relationships identified within the map. In exemplary embodiments, the derivation module 212 may work with one or more components of the map engine 110 to traverse the map. Thus, knowing at least one root element (e.g., an object) associated with the legal matter, further objects and/or the affected people and systems may be derived. For example, for a given organization specific classification code (OSCC), items of data classified by the OSCC may be stored in a particular information repository (e.g., file share or document management system). Typically, there is a steward (i.e., a person responsible for the information record keeping) for each repository. These stewards are affected people which need to be notified about the legal matter.

Once the list of affected people and systems are identified by the derivation module 212, the list may be stored, for example, by legal matter. In exemplary embodiments, the list is stored in the legal matter repository 206, and comprises a list of people and systems with potential information or knowledge relevant to the legal matter. The affected people may comprise employees invoiced in the legal matter, IT staff responsible for managing data or information repositories associated with the legal matter, or records management staff responsible for the information record keeping associated with the legal matter. The list may be stored with additional information including attorney or paralegal data and matter status (e.g., active, closed).

Based on the results of the derivation, various workflow and notifications may be generated. The workflow and notifications will be discussed in more detail in connection with the LCC engine 202 in FIG. 3.

The exemplary user interface module 214 is configured to allow the user 102 to utilize the litigation management engine 204 to derive a list of affected people and/or systems. In some embodiments, the user interface module 214 provides a graphical user interface (GUI) which allows the user 102 to provide scope parameters in order to determine the affected people and systems. In further embodiments, the user interface module 214 provides GUIs for showing results of the derivation of affected people and systems. In some embodiments, the user interface module 214 may be optional.

The legal matter repository 206 may also store collected data from affected people and systems. As will be discussed further, workflow may be generated for the collection of certain data from affected people and systems that are determined by the litigation management engine 204. According to exemplary embodiments, the collected data is stored in a central location (e.g., the legal matter repository 206). In alternative embodiments, the collected data may be stored in more than one legal matter repository 206.

The collected data may or may not be relevant to the legal matter. The user 102, in exemplary embodiments, may review the collected data to determine the relevancy or interest level.

In exemplary embodiments, a link is made between every data file that is put into the legal matter repository 206 and the custodian (e.g., affected person or custodial system/affected system) from which the data file is collected from or is otherwise related to. For example, if the file is shared between a plurality of users 102, the data in the data file may be collected from one user 102, but associated with other custodians (e.g., users 102 and/or custodial systems) The link may be implemented in various manners. In one embodiment, the data file may be stored with a unique file name. An associated table may record, for example, the custodian name(s), unique file name, and collection time. In an alternative embodiment, the data file may be tagged with the custodian name(s), thus establishing a connection between the custodian(s) and the data file. In exemplary embodiments, a data file may be connected to any number of custodians or custodial systems, and therefore may be connected to a plurality of legal matters. For example, a critical contract or piece of e-mail may be relevant to a plurality of legal matters. In many of these cases, there may be one or more custodians or custodial systems that are relevant to a plurality of legal matters as well.

While FIG. 2 shows the LCC engine 202 and the litigation management engine 204 as separate engines, alternative embodiments may combine the two engines into a single engine. In further embodiments, some of the modules within the two engines 202 and 204 may be interchangeably placed in the other engine 204 and 202.

Figure 3:
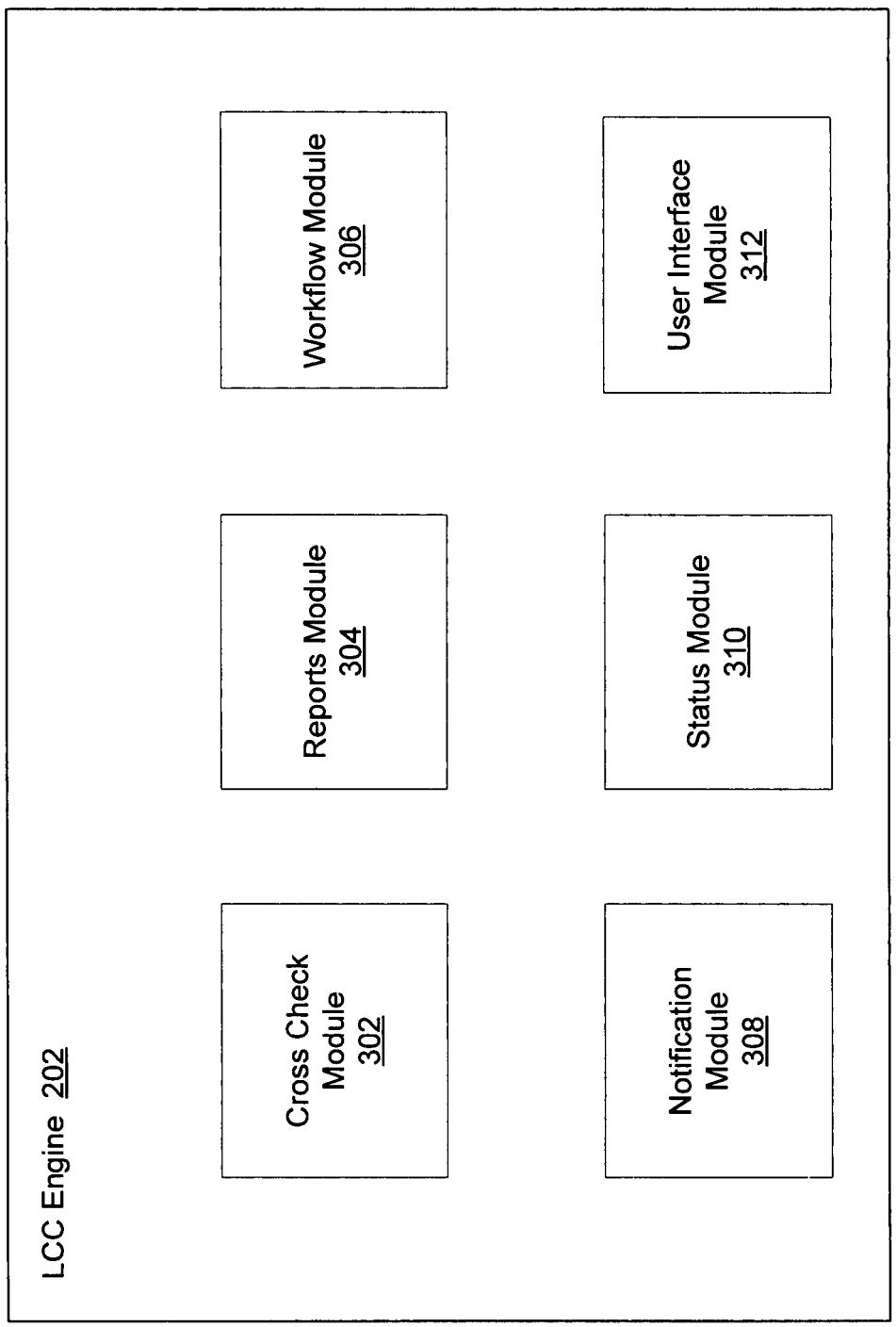
FIG. 3 is a block diagram of an exemplary legal communication and collection engine.

Referring now to FIG. 3, the exemplary LCC engine 202 is shown in more detail. The LCC engine 202 is configured to allow users 102 to manage communications and collections of data from affected people and systems. In exemplary embodiments, the LCC engine 202 comprises a cross-check module 302, a reports module 304, a workflow module 306, a notification module 308, a status module 310, and a user interface module 312.

The exemplary cross-check module 302 is configured to perform a cross-check of affected people or systems (i.e., the custodian or custodial system) involved with one or more legal matters. In some embodiments, the cross-check module 302 receives a criteria name (e.g., custodian or custodial system of interest or a matter of interest) from the user 102 and accesses the legal matter repository 206. In one embodiment, the cross-check module 302 reviews the legal matter repository 206 to determine all legal matters associated with the name of interest. In a further embodiment, the cross-check module 302 may trigger the derivation module 212 to determine a list of legal matters involving the name of interest. In some embodiments, the cross-check module 302 may perform the cross-check on active legal matters, inactive legal matters, or a combination of both active and inactive legal matters.

Based on the cross-check criteria (e.g., name), the cross-check module 302 may determine the legal holds in effect for the custodian or custodial system across all matters. The cross-check module 302 may also determine a list of previously collected data from the custodian or custodial system. In exemplary embodiments, when the data is collected from the custodian or custodial system, the legal matter management system 108 also tracks when the data is collected. Thus, if the custodian is involved in a subsequent matter that may require the collection of previously collected data, the collection does not need to be performed again. In these embodiments, the custodian does not need to be placed under a legal hold, but may, in some embodiments, be placed under an advisory hold where they are reminded of their obligations, informed that the data is already collected, and/or requested to produce any new data not previously collected.

The reports module 304 provides a report of the results determined by the cross-check module 302. In exemplary embodiments, the reports module 304 organizes the results and presents the results to the user via the user interface module 312. The reports module 304 may also prepare reports for various audits based on the custodian, custodial systems, or legal matter. In some embodiments, the reports may be prepared based on templates.

In exemplary embodiments, once the litigation management engine 204 derives the list of affected people and systems for a legal matter, preservation of data or evidence may comprise sending legal hold notices to the affected people and planning and, in some cases, executing interviews with affected people. The exemplary legal hold notices may instruct the affected people not to destroy data related to the legal matter. The interviews, in turn, may determine additional scope parameters to apply to the legal matter. The interviews may also identify more affected people and systems, which may or may not be within the enterprise system 106. For example, a contractor may have been involved on the legal matter.

In exemplary embodiments, the workflow module 306 is configured to automatically generate a notification and/or collection workflow. The notification workflow works in conjunction with the notification module 308 to notify the affected people and administrators of affected systems. The collection workflow provides plans and plan executions to drive the collection of data and evidence associated with the legal matter. The collection plans target collection from the affected people (e.g., custodians) and systems (e.g., custodial systems and their respective stewards).

The notification module 308 sends the legal notices to the affected people and systems. The legal notices may comprise instructions to preserve data and to produce the data or evidence. In some embodiments, the legal notices may be sent to the legal staff and instruct the legal staff on how and when to perform production. In alternative embodiments, the legal notices may be sent to one or more of the affected people with instructions on how and when to perform production.

The exemplary status module 310 is configured to maintain status for requests associated with a legal matter. Each legal matter may comprise one or more requests to the affected people or systems. Requests will be discussed in more detail in connection with FIG. 6-FIG. 8.

The user interface module 312 is configured to allow the user 102 to utilize the LCC engine 202 to perform a cross-check between a plurality of derived lists of affected people and systems. In some embodiments, the user interface module 310 provides a graphical user interface (GUI) which allows the user 102 to selected affected people/systems or a particular legal matter to perform a cross-check with. In further embodiments, the user interface module 310 provides GUIs for showing results of the cross-check. It should be noted that the functions of the user interface module 216 of the litigation management engine 204 and the user interface module 310 of the LCC engine 202 may be combined into a single user interface module located in either engine 202 or 204.

As previously discussed, some of the modules within the litigation management engine 204 and the LCC engine 202 may be interchangeably placed in the other engine 202 and 204. For example, the workflow module 306 and the notification module 308 may be comprised within the litigation management engine 204.

Figure 4:
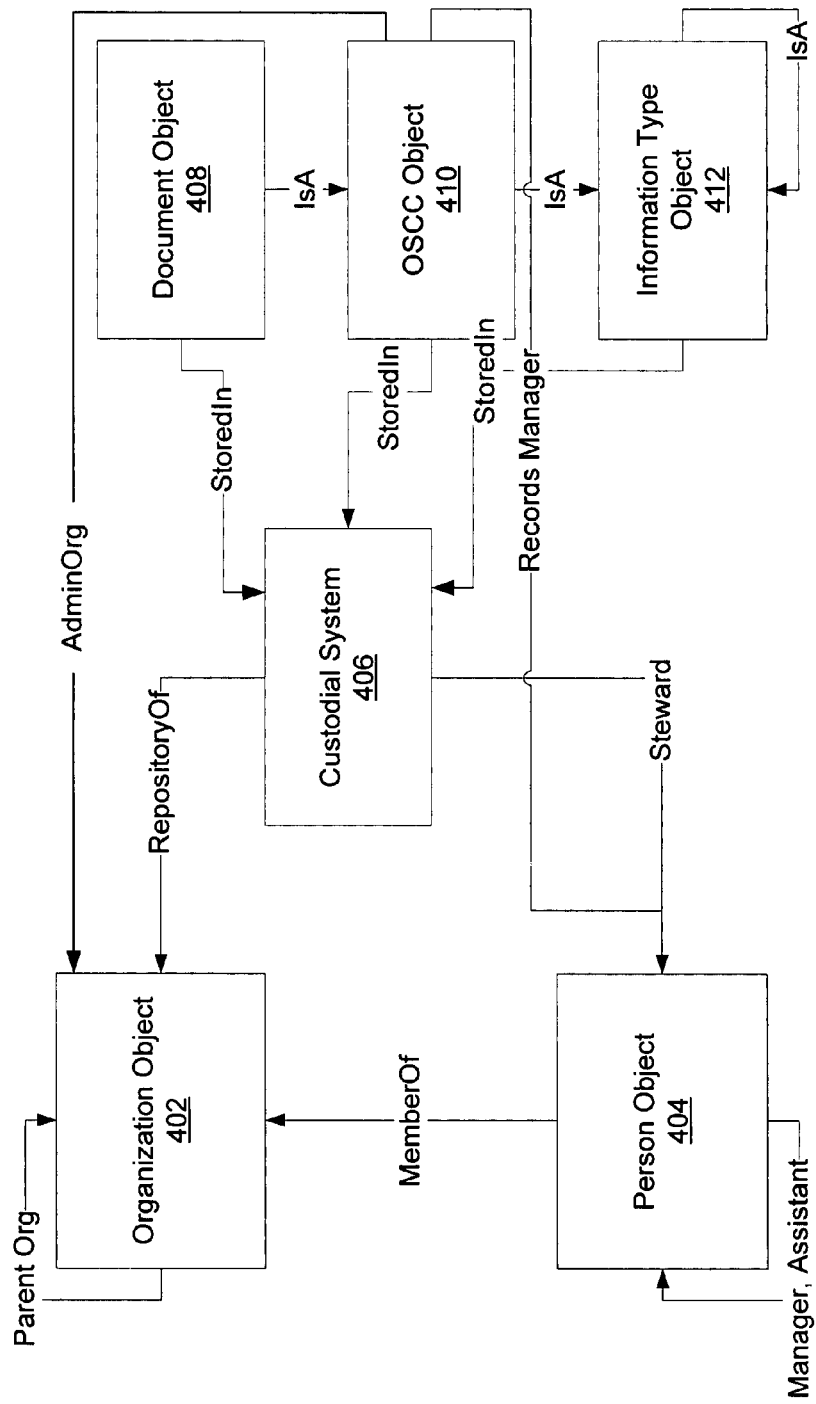
FIG. 4 is a schematic diagram of exemplary relationships between objects within a map of an enterprise.

Referring now to FIG. 4, a schematic diagram of exemplary relationships between primary objects within a map of the enterprise system 106 is shown. Based on these relationships, a list of affected people and/or systems may be derived by the derivation module 212. Exemplary embodiments of the present invention take advantage of the fact that people have certain types of relationships to organizations, and information repositories have a responsible person/people (i.e., stewards) and associated disposal and retention policies. As discussed herein, the map establishes exemplary relationships between the objects as shown. In exemplary embodiments, an object comprises data or metadata associated with information stored in the legal matter repository 206.

In exemplary embodiments, each document is classified with an organization specific classification code (OSCC). The OSCC identifies both an information type and an organization within a single classification code. Any number of organizations may comprise the enterprise system 106. For example, ADM-212 may be an OSCC only utilized by a New York office (i.e., organization) of an investment bank to classify administrative internal memos (i.e., information type).

Because the OSCC provides an intrinsic relationship between the organization, information type, and any policies associated with the OSCC, a user 102 is able to find relevant information more easily and quickly. Based on people, custodians, organizations, or information types known to be relevant to a legal matter, for example, a subset of all enterprise OSCCs can be derived that are relevant to the legal matter. More specifically, the user 102 can search for a specific OSCC and identify systems and people associated with the legal matter. In further embodiments, the user 102 may be able to search for and identify exact data and/or evidence that are classified with a given OSCC.

An organization object 402 includes information about the organization or other groupings of people. In some embodiments, these organizations may be hierarchically organized. Any type of organization object 402 may be utilized. For example, the organization object 402 may include a name of the organization, a parent organization, persons in the organization, repositories or storage mediums utilized by the organization, geography associated with the organization, organization locations, accounting codes, and so forth. One or more organizations may be represented by the organization object 402 and the one or more organizations may be designated according to a hierarchical structure, such as a parent organization.

A person object 404 represents an individual with a role within the organization. For example, the person object 404 may include an employee in the organization. The person object 404 may be associated with one or more items of information by a name, contact information, role in the organization, relationship with other persons 404, organizational affiliations, repository affiliations, responsibilities, job title, and so forth. The person object 404 may be related to the organization object 402 by virtue of a "MemberOf" relationship, which indicates that each person is a member of one or more organizations. For example if a person works at a NY office of an investment bank, the user (i.e., person object 404) is affiliated with the NY office (i.e., organization object 402).

A custodial system object 406 represents storage locations. The custodial system object 406 may include any electronic or non-electronic information repositories, such as a warehouse, a file server, or any other storage mediums. The custodial system object 406 may include or be related to name, system type and details, physical location, network location, access methods, stewards (i.e., the persons and the person object 404 responsible), the organizations that use the custodial system (e.g., organization object 402), information types stored in the custodial system (e.g., information type object 412), and so forth. Accordingly, the custodial system object 406 has a relationship with the other objects shown in FIG. 4.

A document object 408 represents information about documents, papers, text, files, metadata, and other items of data stored in a custodial system (e.g., repository). The information represented by the document object 408 is thus related to the custodial system object 406 by being stored in the custodial system identified by the custodial system object 406.

An OSCC object 410 is associated with a classification code (i.e., the OSCC) assigned to each item of data associated with the document object 408. The OSCC object 410 may indicate information type, location in the custodial system object 406 for the information, policy information, such as a records manager, and so forth. Once the OSCC object 410 is assigned to the item of data associated with the document object 408, the classification may be stored in a repository associated with the custodial system object 406. Each classification may be associated with one or more persons responsible for managing the information assigned the specific classification. Thus, the person object 404 may be related to the OSCC object 410.

In exemplary embodiments, information represented by the document object 408 is related to the OSCC object 410 by a hierarchical taxonomy of types. In other words, the information represented by the document object 408 may include OSCC data and be organized according to the OSCC data.

An information type object 412 is associated with the OSCC object 410 classification. The items of data may be organized as a hierarchical taxonomy, for example, utilizing the information type. The information type object 412 may include name, identifiers, such as record keeping codes, parent type, repository affiliations (i.e., default location for the information), organization affiliations, and so forth. An information type is a broad class of information, such as "Accounting Invoice" or "Quarterly Financial Report", for example. A data type or document may, optionally, be associated with one or more repositories via the custodial system object 406 discussed herein. Accordingly, the information type object 412 is related to the custodial system object 406 and to the OSCC object 410. In exemplary embodiments, the OSCC is a more specific class of information that a given information type uses within a given organization.

The map engine 108 utilizes the relationships between the various objects described in FIG. 4 to generate the map. Subsequently, the derivation module 212 can determine the people and systems involved with a legal matter, and the cross-check module 302 can determine if the people or systems are associated with a plurality of legal matters. Although FIG. 4 specifies the relationship between the various objects and the various objects that may have specified relationships, further embodiments may also comprise other objects and/or relationships between the objects and still fall within the scope of various embodiments.

Figure 5:
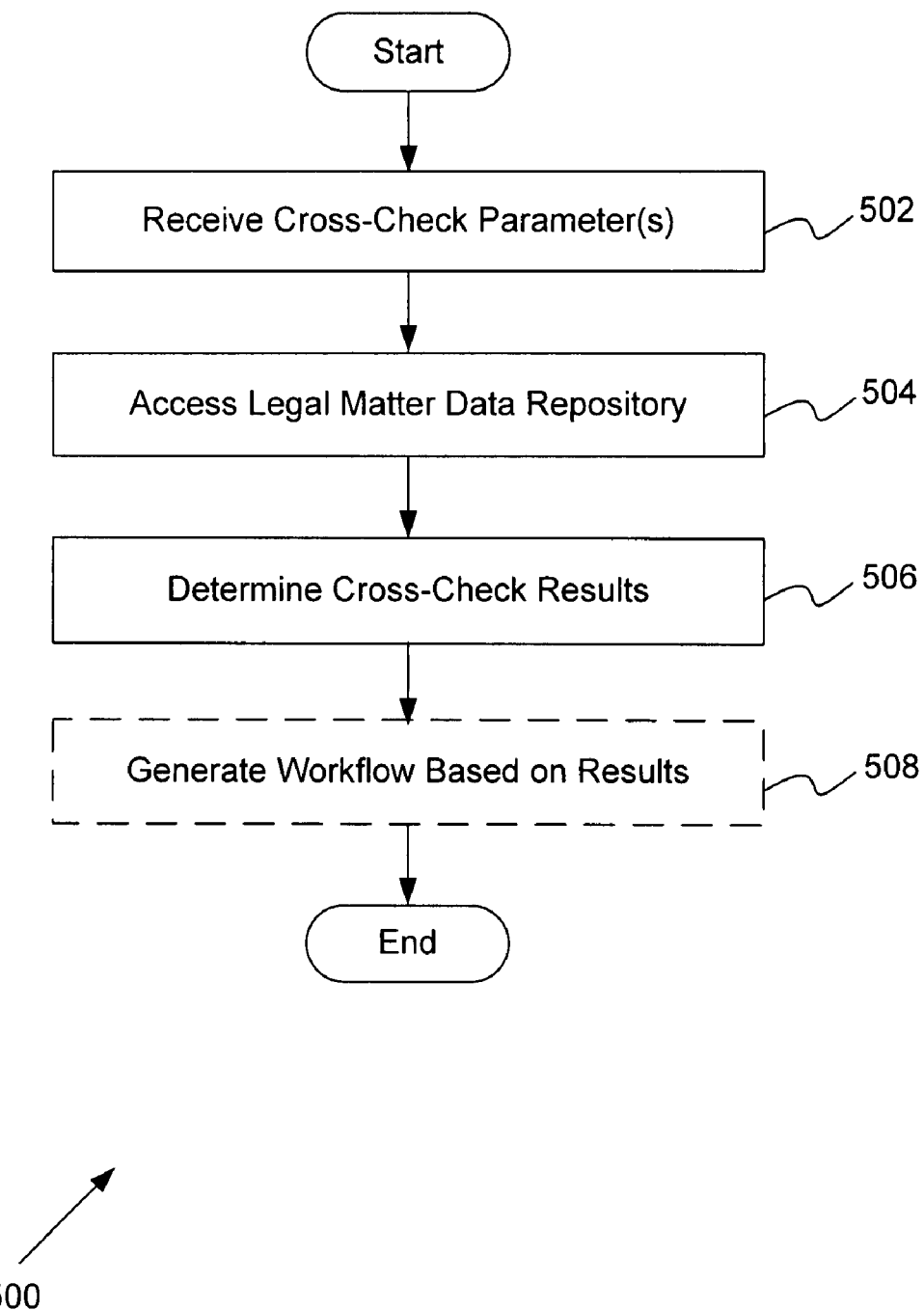
FIG. 5 is a flowchart of an exemplary method for conducting a cross-check on legal matters across an enterprise system.

FIG. 5 is a flowchart 500 of an exemplary method for conducting a cross-check on legal matters across the enterprise system 106. In step 502, the cross-check module 302 receives cross-check parameter(s). In exemplary embodiments, the cross-check parameters may comprise a custodian name, a custodial system name, and/or a legal matter. The cross-check parameters may also include an indication of whether the cross-check should be performed on active legal matters, inactive legal matters, or a combination of both active and inactive legal matters. The cross-check parameters may be received from a user (e.g., an attorney) or a workflow system. For example, if automatically generated workflow requires a cross-check be performed, then the workflow module 306 (or other similar module) may provide the parameters.

In step 504, the cross-check module 302 accesses the legal matter repository 206. Using the cross-check parameters, the cross-check module 302 performs a cross-check in step 506. In exemplary embodiments, the cross-check comprises searching for custodians, using the cross-check parameters across all legal matters stored in the legal matter repository 206. In some embodiments, the cross-check may be performed to determine legal matters or common custodians based on legal holds or collections. Examples of various cross-checks and results will be discussed in connection with FIG. 6-FIG. 8.

In optional step 508, one or more workflow based on the results may be generated. Workflow may comprise any further actions that should be taken based on the results. For example, if a cross-check indicates that the custodian is no longer involved in any active legal matters, the custodian may be released from the legal hold (e.g., via sending a release notification). In an alternative example, if the cross-check indicates that a request is outstanding, an additional request communication may be sent to the custodian.

In some embodiments, when a release notice is created, a cross-check on the custodians & custodial systems is performed. If the cross-check turns up current active holds on other matters, an approval workflow may be triggered that will automatically route a draft (e.g., proposed) release to various pre-configured parties in a legal team for publication approval. Example parties may include the attorneys for the other matters where the custodian is under hold.

Figure 6:
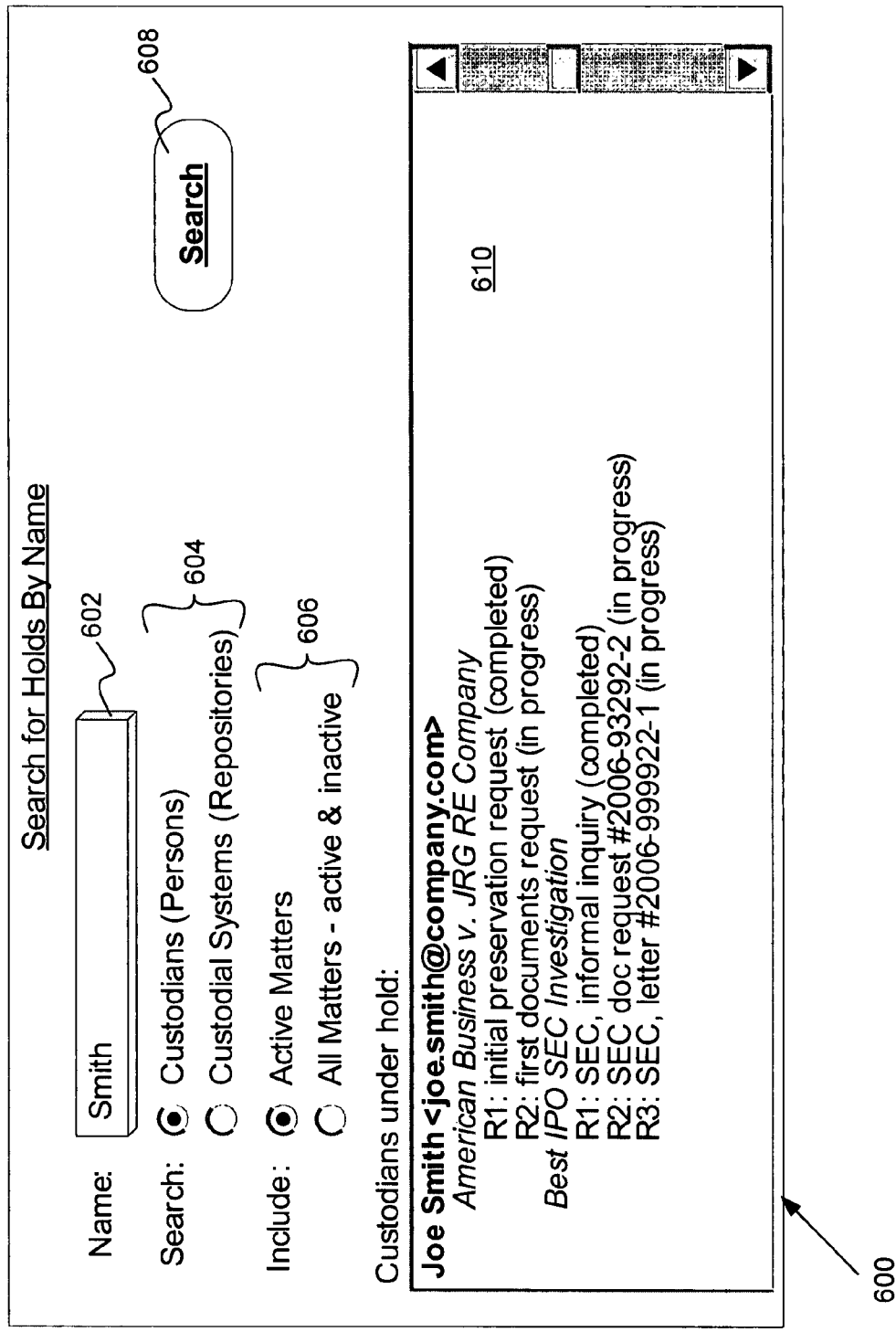
FIG. 6 is a screenshot of a user interface for searching for holds by name.

FIG. 6 is an exemplary screenshot of a user interface 600 configured to search for holds by name. This exemplary user interface 600 allows a search of all legal holds across all matters (or other scope parameters). In exemplary embodiments, the user interface module 216 or 310 provides the user interface 600 to the user 102 on their display device. The user 102 may then enter the cross-check search parameters. In the present embodiment, the user 102 may provide a name in a name field 602. The user 102 may also indicate whether to search for a custodian (i.e., person) or a custodial system (i.e., information repository) using the entered name via a search field 604. Additionally, the user 102 may indicate whether to search active matters or all matters in an include field 606. It should be noted that an inactive matter indicator may be available in the include field 606, in some embodiments.

Once the search parameters are entered into the appropriate fields, the user 102 initiates the search by selecting a search button 608. Subsequently, results will be presented to the user 102 in a results display 610. In some embodiments, the various entries in the results display 610 comprise links to further information. For example, selecting "R1: initial preservation request (completed)" may provide a list of all data obtained from the custodian under the R1 request in a subsequent display or window.

In the present example, the user 102 enters "Smith" in the name field 602 and indicates that the search pertains to a custodian (e.g., person) in the search field 604. The user 102 further indicates that the search is directed to active matters in the include field 606. As a result, a list of all Smith custodians associated with the legal matter repository 206 is presented in the results display 610. In the present example, only one Smith (i.e., Joe Smith) is found. However, Joe Smith is associated with two legal matters: a litigation matter (i.e., American Business v. JRG RE Company) and a regulatory matter (i.e., Best IPO SEC Investigation).

Under each legal matter, a listing of requests (e.g., R1, R2) is provided. In exemplary embodiments, each request represents a different workflow associated with the legal matter. For example, a request may be sent to custodians involved with the American Business v. JRG RE Company legal matter to preserve their data (i.e., R1: initial preservation request) and a separate request may be sent requesting production of particular documents (i.e., first documents request). In exemplary embodiments, the status of each request is also provided in the results display 610. For example, a request for production of a particular letter (i.e., R3: SEC, letter #2006-999922-1) is in progress.

FIG. 7 is a screenshot of a user interface 700 for performing a custodial cross check. The custodial cross-check user interface 700 provides a matter field 702 where a legal matter may be entered as a search parameter for the cross-check. Additionally, an include field 704 allows a user 102 to indicate whether the search should be conducted on active matters or all matters. It should be noted that an inactive matter indicator may be available in the include field 704, in some embodiments.

Before releasing a custodian from a legal hold associated with an inactive legal matter, it is prudent to insure that the custodian is not under a legal hold for another matter. In the present example, Best IPO SEC Investigation legal matter may be settled or closed (i.e., inactive). If a search of all active matters provides a result that is clear (i.e., there is no displayed active matter for the custodian), then the custodian may be released from the legal hold. In embodiments where the custodian is still under at least one other legal hold (as shown), a notification may be generated that informs the custodian that while he is released from a legal hold of one legal matter, he is still under a legal hold for one or more other legal matters.

As such, embodiments of the present invention provide a mechanism for insuring a release of a legal hold does not compromise other legal holds. In an exemplary usage of the present invention, an attorney creating a release notice may validate that the integrity of other legal holds are not compromised and that clear instructions are given to the custodian or the steward of the custodial system being released from a legal hold. For example, when a notice is sent to a custodian indicating a release from a legal hold, the custodian may be advised of a list of other holds that they are currently subject to. This list is generated by the cross check module 302. In some embodiments, the release notice may comprise a list of all active holds for the custodian, a link to provide further information on each active hold, and optional contact information for the attorney or paralegal for each of the currently active holds.

Upon selection of a search button 706, a listing of custodians/custodial systems that match the search parameter and are involved in other legal matters and/or legal holds is displayed in a results display 708. As shown, the custodian/custodial system is displayed along with a list of other legal matters they are also associated with. Thus, the results comprise a cross-check list of custodians and custodial systems that intersect with the legal matter of interest identified in the matter field 702. In the present example, a custodian, Joe Smith, is involved with both the Best IPO SEC Investigation legal matter and the American Business v. JRG RE Company legal matter. Additionally, a custodial system, NYC Investment Bank Deal Server, is involved with the Best IPO SEC Investigation legal matter, the American Business v. JRG RE Company legal matter, and the Old Banc Shareholders v. GFRD legal matter. Thus, the custodial cross-check user interface 700 allows a search for both custodians and custodial systems.

In various embodiments, the entries in the results display 708 comprise links to further information. For example, selecting "R1: initial preservation request (completed)" may provide a list of all data obtained from the custodian under the R1 request for the American Business v. JRG RE Company legal matter.

With respect to the custodial system identified in the results display 708, a corresponding steward may also be identified. The steward is a person that is responsible for managing the custodial system. The identification of the steward is useful, for example, if a notification or workflow is required. In the present example, Sam Jax is the steward of the custodial system identified by the cross check module 302.

FIG. 8 is a screenshot of a user interface 800 for searching for collections by name. The collections user interface 800 allows the user 102 to determine what data has been collected for various legal matters. This determination is important in that collected data associated with a plurality of legal matters do not need to be recollected for each different legal matter. This mechanism is enabled because the collections and holds revolve around the custodian or custodial system and not the legal matters, themselves. Furthermore, previously collected information may be data mined (e.g., searched, reviewed) by the user 102 to determine if additional affected people may be relevant to a new legal matter. For example, previously collected e-mail messages may reveal other parties relevant to the new legal matter.

As shown, the collections user interface 800 comprises a name field 802, a search field 804, and an include field 806. Based on the search parameters, a listing of all collected data from the custodian entered in the name field 802 are provided in a results display 808. For example, Joe Smith has provided e-mails from years 2000 and 2001 in compliance with request R1 of the American Business v. JRG RE Company legal matter. In some embodiments, selection of the request (e.g., R1, R2) may provide a listing of the collected documents and/or access to the collected documents.

While embodiments of the present invention utilizes both custodian and custodial systems to describe the people and systems that may be affected, it should be noted that the term "custodian" may be utilized to refer to both people and systems. That is custodian may comprise people, users 102, and custodial systems.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for conducting a cross-check on legal matters in an enterprise system, comprising:
    executing instructions stored in memory by a processor to track relationships between a plurality of legal matters and custodians;
    executing instructions stored in memory by the processor to receive search parameters from a user to search for one or more custodians across the plurality of legal matters;
    executing instructions stored in memory by the processor to access legal matter information and tracked relationships between the plurality of legal matters and custodians;
    executing instructions stored in memory by the processor to determine results based on the search parameters, tracked relationships, and the legal matter information; and
    executing instructions stored in memory by the processor to provide the results of the determination to the user, the results further comprising an identification of the one or more searched custodians and the legal matters associated with the searched one or more custodians; and
    executing instructions stored in memory by the processor to generate a workflow based on the results, the workflow comprising a notification to the custodian regarding a release from a hold or a continuous hold for a legal matter, the notification regarding a continued hold being embedded in another workflow or notification to the custodian.

2. The method of claim 1 wherein the search parameters comprise custodian identity information.

3. The method of claim 1 wherein the search parameters comprise a legal matter.

4. The method of claim 1 wherein the search parameters comprise existing legal hold information.

5. The method of claim 1 further comprising executing instructions stored in memory by the processor to determine a status of one or more requests to a custodian.

6. The method of claim 1 wherein the results comprises a list of one or more legal matters per custodians.

7. The method of claim 1 wherein executing instructions stored in memory by the processor to track relationships comprises executing instructions stored in memory by the processor to utilize a relationship map.

8. The method of claim 1 wherein the results comprise a list of holds per custodian, where the holds may comprise holds in legal matters other then the legal matter of interest.

9. The method of claim 1 wherein the results comprise a list of collections per custodian, wherein the list of collections may comprise collections for legal matters other than the legal matter of interest.

10. The method of claim 1 wherein the custodian comprises a person.

11. The method of claim 1 wherein the custodian comprises a custodial system.

12. The method of claim 1 wherein the user comprises a manager of a team, and the search parameters are directed to determining holds for the manager's staff.

13. The method of claim 1 wherein the user comprises a records manager and the search parameters are directed to determining holds relevant to organization specific classification codes (OSCCs) that apply to the records manager.

14. The method of claim 1 wherein the user comprises a workflow system.

15. The method of claim 1 wherein the relationships tracked comprise involvement in one or more legal holds.

16. The method of claim 1 wherein the relationships tracked comprises involvement in one or more collections.

17. A non-transitory computer readable storage medium having a program embodied thereon, the program providing instructions for a method for conducting a cross-check on legal matters in an enterprise system, comprising:
    tracking relationships between a plurality of legal matters and custodians;
    receiving search parameters from a user to search for one or more custodians across the plurality of legal matters;
    accessing legal matter information and tracked relationships;
    determining results based on the search parameters, tracked relationships, and the legal matter information;
    providing results of the determination to the user, the results further comprising an identification of the one or more searched custodians and the legal matters associated with the searched one or more custodians; and
    generating a workflow based on the results, the workflow comprising a notification to the custodian regarding a release from a hold or a continuous hold for a legal matter, the notification regarding a continued hold being embedded in another workflow or notification to the custodian.

* * * * *